United States Patent
Egan et al.

(10) Patent No.: US 9,500,884 B2
(45) Date of Patent: Nov. 22, 2016

(54) FLUID FILLED ADJUSTABLE CONTACT LENSES

(75) Inventors: William Egan, Jackson, WY (US); Lisa Nibauer, Short Hills, NJ (US)

(73) Assignee: Adlens Beacon Inc., Iselin, NJ (US)

( * ) Notice: Subject to any disclaimer, the term of this patent is extended or adjusted under 35 U.S.C. 154(b) by 232 days.

(21) Appl. No.: 13/270,797

(22) Filed: Oct. 11, 2011

(65) Prior Publication Data

US 2012/0268712 A1   Oct. 25, 2012

Related U.S. Application Data

(60) Provisional application No. 61/391,782, filed on Oct. 11, 2010.

(51) Int. Cl.
| | |
|---|---|
| G02C 7/00 | (2006.01) |
| G02C 7/02 | (2006.01) |
| G02C 7/04 | (2006.01) |
| G02C 7/08 | (2006.01) |

(52) U.S. Cl.
CPC ............. *G02C 7/085* (2013.01); *G02C 7/04* (2013.01)

(58) Field of Classification Search
CPC ....... G02C 7/085; G02C 7/04; A61F 2/1635; G02B 3/14
USPC ......... 351/159.73, 159.68, 158, 159.49, 161, 351/159.34, 165, 168, 177, 169; 349/13; 623/4.1, 5.11, 6.11, 6.13; 264/1.36
See application file for complete search history.

(56) References Cited

U.S. PATENT DOCUMENTS

| | | | |
|---|---|---|---|
| 4,466,705 | A | 8/1984 | Michelson |
| 4,709,996 | A | 12/1987 | Michelson |
| 5,684,637 | A | 11/1997 | Floyd |
| 5,728,155 | A | 3/1998 | Anello et al. |
| 5,964,802 | A | 10/1999 | Anello et al. |
| 5,984,962 | A | 11/1999 | Anello et al. |
| 5,997,140 | A | 12/1999 | Zhang et al. |
| 6,139,146 | A | 10/2000 | Zhang et al. |

(Continued)

FOREIGN PATENT DOCUMENTS

| | | |
|---|---|---|
| JP | 2005502389 A | 1/2005 |
| JP | 2005535942 A | 11/2005 |

(Continued)

OTHER PUBLICATIONS

Belfiore, "Embedded Technologies: Power From the People" Aug. 2010, Smithsonian Magazine http://www.smithsonianmag.com/specialsections/40th-anniversary/Embedded-Technologies-Power-From-the-People.html, accessed Apr. 11, 2013.*

(Continued)

*Primary Examiner* — Scott J Sugarman
*Assistant Examiner* — Mustak Choudhury
(74) *Attorney, Agent, or Firm* — Greenberg Traurig, LLP

(57) ABSTRACT

A fluid-filled adjustable contact lens is provided. An exemplary contact lens includes a lens chamber configured to be positioned on a pupil of a user wearing the contact lens; a reservoir fluidly connected to the lens chamber; an actuator configured to transfer fluid back and forth between the lens chamber and the reservoir; a sensor configured to sense movement from the user and transmit a control signal when a predetermined movement is performed by the user; and a processor configured to actuate the actuator upon receipt of the control signal from the sensor.

8 Claims, 4 Drawing Sheets

(56) References Cited

U.S. PATENT DOCUMENTS

| | | |
|---|---|---|
| 6,855,164 B2 | 2/2005 | Glazier |
| 6,885,818 B2* | 4/2005 | Goldstein ................ 396/59 |
| 7,229,475 B2 | 6/2007 | Glazier |
| 7,311,398 B2* | 12/2007 | Kuiper et al. ........... 351/159.04 |
| 7,334,892 B2 | 2/2008 | Goodall et al. |
| 7,334,894 B2 | 2/2008 | Hillis et al. |
| 7,344,244 B2 | 3/2008 | Goodall et al. |
| 7,350,919 B2 | 4/2008 | Hillis et al. |
| 7,390,088 B2 | 6/2008 | Goodall et al. |
| 7,405,884 B2 | 7/2008 | Nishioka et al. |
| 7,470,027 B2 | 12/2008 | Hillis et al. |
| 7,486,988 B2 | 2/2009 | Goodall et al. |
| 7,656,569 B2 | 2/2010 | Hillis et al. |
| 2002/0049389 A1* | 4/2002 | Abreu ...................... 600/558 |
| 2002/0067271 A1* | 6/2002 | Depta ...................... 340/573.1 |
| 2004/0169816 A1 | 9/2004 | Esch |
| 2005/0099594 A1* | 5/2005 | Blum et al. ............... 351/160 R |
| 2006/0155372 A1* | 7/2006 | Coroneo ................... 623/4.1 |
| 2007/0010757 A1 | 1/2007 | Goodall et al. |
| 2007/0019157 A1 | 1/2007 | Hillis et al. |
| 2007/0142909 A1* | 6/2007 | Peyman .................. 623/6.11 |
| 2008/0137031 A1 | 6/2008 | Hillis et al. |
| 2008/0161673 A1 | 7/2008 | Goodall et al. |
| 2008/0231799 A1* | 9/2008 | Iuliano ..................... 351/161 |
| 2008/0231801 A1* | 9/2008 | Iuliano ..................... 351/177 |
| 2008/0266635 A1 | 10/2008 | Nishioka et al. |
| 2009/0195751 A1 | 8/2009 | Hillis et al. |
| 2009/0204207 A1* | 8/2009 | Blum et al. ............... 623/4.1 |
| 2010/0078838 A1* | 4/2010 | Pugh et al. ................ 264/1.38 |
| 2010/0103373 A1 | 4/2010 | Hillis et al. |
| 2010/0121443 A1* | 5/2010 | Michel et al. ............... 623/6.22 |
| 2010/0177279 A1 | 7/2010 | Hillis et al. |
| 2012/0019773 A1* | 1/2012 | Blum et al. ................ 351/169 |

FOREIGN PATENT DOCUMENTS

| | | |
|---|---|---|
| JP | 2006506196 A | 2/2006 |
| JP | 2009003335 A | 1/2009 |
| WO | WO 2004/046768 | 6/2004 |
| WO | WO 2005/088388 | 9/2005 |
| WO | WO 2008/115251 | 9/2008 |
| WO | 2009/117506 A2 | 9/2009 |
| WO | WO 2010/062504 | 6/2010 |

OTHER PUBLICATIONS

International Search Report and Written Opinion issued in connection with corresponding application No. PCT/US11/55743, mailed Mar. 15, 2012, 7 pages.

Supplementary European Search Report dated Feb. 4, 2013 based on Application No. 10824196, 4 pages.

Mexican Office Action dated Jun. 26, 2013 based on Application No. MX/a/2013/004011, 2 pages.

Extended European Search Report related to European Patent Application No. EP 11 83 3241, dated May 8, 2014; 7 pages.

Zhang et al., "Integrated fluidic adaptive zoom lens", Optics Letters, vol. 29, No. 24, Dec. 15, 2004, pp. 2855-2857.

\* cited by examiner

FLUID FILLED ADJUSTABLE CONTACT LENSES

CROSS REFERENCE TO RELATED APPLICATIONS

This application claims the benefit of U.S. Provisional Patent Application No. 61/391,782 filed Oct. 11, 2010, which is hereby incorporated by reference in its entirety.

BACKGROUND

1. Field

Embodiments of the present invention relate to fluid filled lenses and in particular to fluid-filled adjustable contact lenses.

2. Background Art

Basic fluid lenses have been known since about 1958, as described in U.S. Pat. No. 2,836,101, incorporated herein by reference in its entirety. More recent examples can be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology and microelectronics.

Fluid lenses have also been proposed for ophthalmic applications (see, e.g., U.S. Pat. No. 7,085,065, which is incorporated herein by reference in its entirety). Power adjustment in fluid lenses has been effected by injecting additional fluid into a lens cavity, by electrowetting, application of ultrasonic impulse, and by utilizing swelling forces in a cross-linked polymer upon introduction of a swelling agent such as water.

In all cases, the advantages of fluid lenses, such as a wide dynamic range, ability to provide adaptive correction, robustness, and low cost have to be balanced against limitations in aperture size, possibility of leakage, and consistency in performance. The '065 patent, for example, has disclosed several improvements and embodiments directed towards effective containment of the fluid in the fluid lens to be used in ophthalmic applications (see, e.g., U.S. Pat. No. 6,618,208, which is incorporated by reference in its entirety).

BRIEF SUMMARY

A fluid-filled adjustable contact lens is provided. An exemplary contact lens includes a lens chamber configured to be positioned on a pupil of a user wearing the contact lens, a reservoir fluidly connected to the lens chamber, an actuator configured to transfer fluid back and forth between the lens chamber and the reservoir, a sensor configured to sense movement from the user and transmit a control signal when a predetermined movement is performed by the user, and a processor configured to actuate the actuator upon receipt of the control signal from the sensor.

The contact lens can include a pressure sensor configured to detect a blinking by a user wearing the contact lens and the predetermined movement can be a predetermined blinking pattern measured by the pressure sensor. The contact lens can additionally or alternatively include a microaccelerometer configured to detect motion of the user's eyeball and the predetermined movement can be a predetermined movement of the user's eyeball measured by the microaccelerometer. The contact lens can additionally or alternatively include a sensor configured to detect movement of the user's eyebrows and the predetermined movement can be a predetermined movement of the user's eyebrows measured by the sensor.

Further embodiments, features, and advantages of the present invention, as well as the structure and operation of the various embodiments of the present invention, are described in detail below with reference to the accompanying figures.

BRIEF DESCRIPTION OF THE FIGURES

The accompanying figures, which are incorporated herein and form a part of the specification, illustrate the present invention and, together with the description, further serve to explain the principles of the invention and to enable a person skilled in the pertinent art to make and use the invention.

Embodiments of the present invention will be described with reference to the accompanying figures.

DETAILED DESCRIPTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it would be within the knowledge of one skilled in the art to effect such feature, structure or characteristic in connection with other embodiments whether or not explicitly described.

Many individuals rely on eyeglasses, contact lenses, and the like in order to improve their vision. Fluid filled adjustable lenses have several advantages over conventional fixed power lenses devices.

In some embodiments, a fluid filled lens can be adjusted continuously over a desired power range by the wearer. This allows a user to adjust the power to precisely match the refractive error for a particular object distance in a particular light environment to compensate for alteration of the natural depth of focus of the eye that depends on the wearer's pupil size. In some embodiments, fluid filled lenses can alternatively or additionally be used to provide image magnification outside the physiological range of human vision.

Some individuals wear eyeglasses or contacts having separate lens regions that provide differing optical properties. For example, a first region can correct for near-sightedness, whereas a second region can correct for far-sightedness. Alternatively, one or both of the regions can provide little to no optical correction. Examples of such multi-focal lenses include conventional bi-focal and tri-focal lenses, which are often separated by a visible line into distinct regions. Another type of multi-focal lens is known as a progressive lens. In this lens, the separate regions are separated by a gradual change in optical properties. Users often complain that such multi-focal and progressive lenses suffer from distortion, image jump, and/or limited optical zones.

Figure 1:
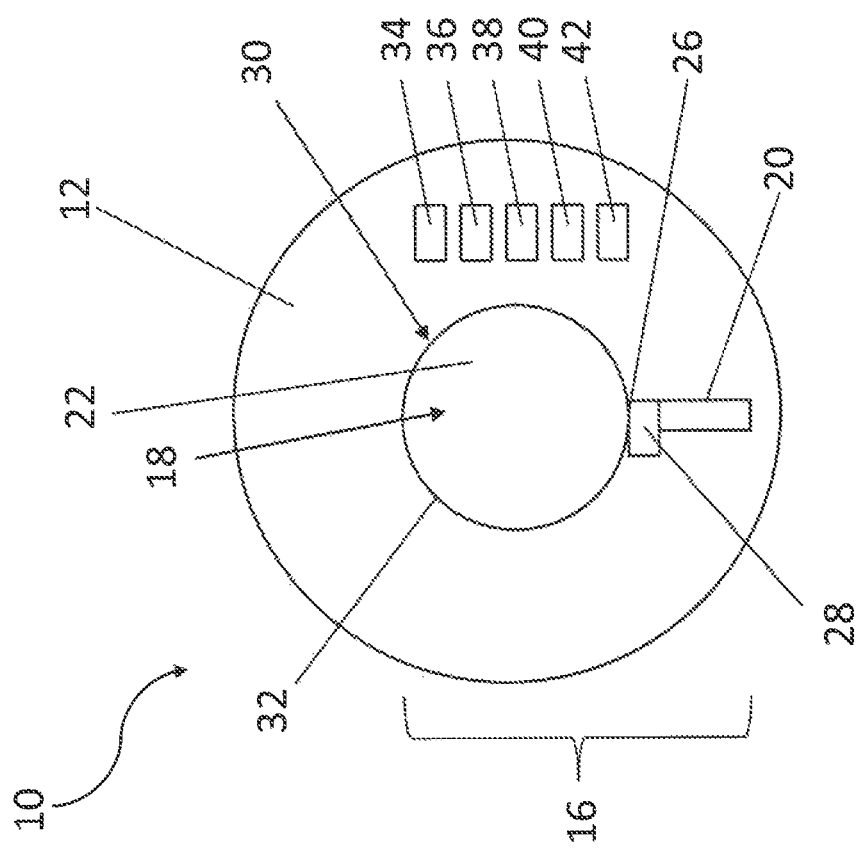
FIG. 1 illustrates a front view of an embodiment of a fluid filled adjustable contact lens.
Figure 2:
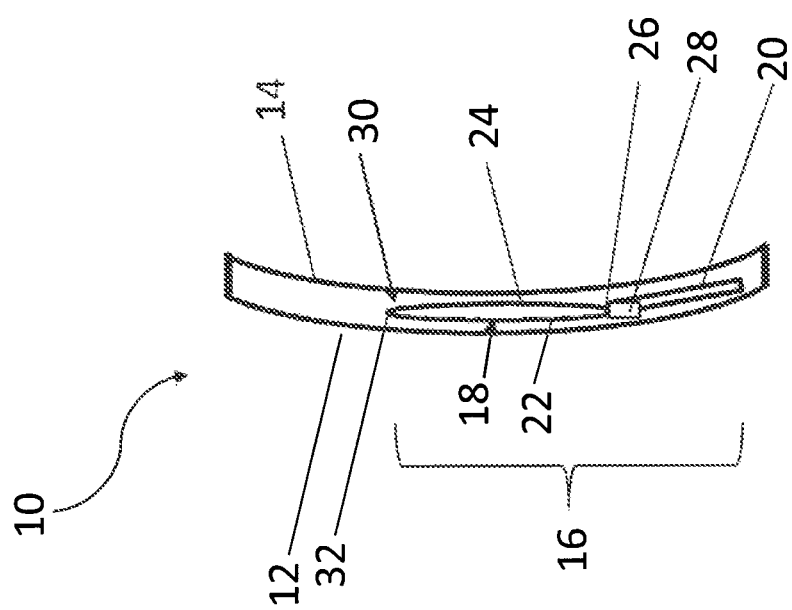
FIG. 2 illustrates a side view of the contact lens of FIG. 1.

FIGS. 1 and 2 illustrate a front and side view, respectively, of a contact lens 10 according to one embodiment of the present invention. Contact lens 10 includes a front surface 12 and a back surface 14, and includes a fluid-filled lens module 16 disposed between the front and back surfaces 12, 14. Fluid-filled lens module 16 includes a lens chamber 18 fluidly sealed to a reservoir 20. Lens chamber 18 includes a front membrane 22 fluidly sealed to a back membrane 24 with an opening 26 leading to reservoir 20. To change the optical power of fluid filled lens module 16, an actuator 28 manipulates reservoir 20 to transfer fluid between lens chamber 18 and reservoir 20, thereby causing front and back membranes 22, 24 to change shape. In FIG. 1, lens chamber 18 defines an optical zone 30 configured to provide the user clear and undistorted vision. In this embodiment, optical zone 30 is roughly the same size as lens chamber 18. In other embodiments, optical zone 30 can be larger or smaller than lens chamber 18, as desired.

In one embodiment, the total fluid volume in lens module 16 is approximately $5 \times 10^{-5}$ cc, with the fluid volume in the lens chamber 18 itself approximately 0.14 mm$^3$, or $1.4 \times 10^{-5}$ cc. In one embodiment, the additional fluid required to increase optical power in lens chamber 18 by 3.0 diopters is $1.4 \times 10^{-5}$ cc.

In one embodiment, as liquid moves into or out of lens chamber 18, the curvature of front membrane 22 changes between an optical power suitable for distant focus and an optical power suitable for near focus. In some embodiments, front membrane 22 also deforms front surface 12 of contact lens 10, resulting in a greater curvature of front surface 12, which can result in greater optical power. In other embodiments, front surface 12 does not deform when one or both of membranes 22, 24 are inflated or deflated. In one embodiment, the inflated membrane is an aspheric shape with negative spherical aberration, which can be useful for individuals suffering from near-sightedness. In one embodiment, a peak bulge at maximum inflation does not cause a significant increase in pressure on the individual's cornea. For example, in one such embodiment, the maximum inflation can be about 3 microns per diopter for a 3.5 mm diameter optic.

In one embodiment, the deformation of lens chamber 18 can produce a non-spherical deflection. To counteract this, the front and/or back surfaces 12, 14 of contact lens 10 can be aspherical to correct for any astigmatism created by the deflection. For example, in one embodiment, front surface 12 can counteract astigmatism caused by deformation, whereas in another embodiment, back surface 14 counteracts the deformation. Additionally or alternatively, a thickness of one or both of front and back membranes 22, 24 can be contoured so as to effect a spherical deformation of the membrane when inflated. For example, in an embodiment, front membrane 22 includes an inset portion that is more flexible than other portions of front membrane 22, such that transfer of the fluid between lens chamber 18 and reservoir 20 causes the shape of the inset portion to change in a spherical manner without substantially changing portions of front membrane 22 other than the inset portions.

As illustrated in FIG. 1, optical zone 30 is located in the center of contact lens 10, and is designed to be centered on the pupillary center of the user's eye. The diameter of optical zone 30 can range from 3-6 mm to correspond to a user's pupil size. In one embodiment, the diameter of optical zone 30 is 3.5 mm. Optical zone 30, however, can be significantly smaller or larger than the user's pupil, if desired. In FIG. 1, contact lens 10, lens chamber 18, and optical zone 30 are circular in shape, but one or more of these features can be any other suitable shape, such as elliptical or oval. As one example, some users may desire an optical zone having a larger horizontal range. Outside edge 32 of lens chamber 18, corresponding to optical zone 30 in the embodiment of FIG. 1 can be smoothly blended within contact lens 10, so that image jump or perceivable image distortions are avoided. In some embodiments, the transition zone is approximately 2-3 mm in width. In some embodiments, the transition zone is 1-5 mm in length. The length of the transition zone can be determined by the gradient in power within this zone, since visual performance of this zone is less important compared to optical zone 30. Because reservoir 20 is located outside optical zone 30 and thus outside the user's field of view, the fluid stored in reservoir 20 does not affect the vision of the user.

In one embodiment, front membrane 22 and back membrane 24 are formed from a single continuous piece of membrane material. In other embodiments, the membranes can be separate pieces sealed together along one or more edges. For example, front membrane 22 and back membrane 24 can be sealed together via their outside edge 32. Opening 26 in the seal is located at reservoir 20 to allow for fluid to flow between lens chamber 18 and reservoir 20. Reservoir 20 is illustrated in FIG. 1 as substantially rectangular and extending in a radial direction away from optical zone 30. Reservoir 20 can, however, be square, circular, elliptical, triangular, or any other suitable shape. In some embodiments, reservoir 20 only extends partially in a radial direction. For example, in some embodiments, reservoir 20 is substantially "L" shaped, with a portion of the reservoir running concentrically to outside edge 32 of optical zone 30.

In one embodiment, front membrane 22 and back membrane 24 are substantially the same shape and size. In one embodiment, both front membrane 22 and back membrane 24 are flexible sheets. In other embodiments, only one of front and back membranes, 22 and 24, are flexible. Front and back membranes 22, 24 are configured to form a fluid envelope between the two membranes. The two membranes can be secured together by any suitable method, such as adhesive, ultrasonic welding, or any similar process. Membranes 22 and 24 can be sealed to contact lens 10 by any known method, such as heat sealing, adhesive sealing or laser welding. Membranes 22 and 24 can be at least in part bonded to a support element that is in turn bonded to contact lens 10. Membranes 22 and 24 can be substantially flat when sealed but can be thermoformed to a specific curvature or spherical geometry.

In certain embodiments, membranes 22 and 24 by themselves have no constraints in their optical properties. In other embodiments, membranes 22 and 24 have constraints in their optical properties, e.g., an index of refraction, that match the optical properties of fluid within lens module 16.

The choice of materials for each of the pieces in the embodiments of contact lens described herein can be informed by the requirements of mechanical properties, temperature sensitivity, optical properties such as dispersion, moldability properties, or any other factor apparent to a person having ordinary skill in the art. In one embodiment, the thickness of the membranes can range between 3 to 10 microns, or any other suitable thickness. The membranes can be made of a flexible, transparent, water impermeable material, such as, for example and without limitation, clear and elastic polyolefins, polycycloaliphatics, polyethers, polyesters, polyimides and polyurethanes, for example, polyvinylidene chloride films. Other polymers suitable for use as membrane materials include, for example and without limitation, polysulfones, polyurethanes, polythiourethanes, polyethylene terephthalate, polymers of cycloolefins and aliphatic or alicyclic polyethers. The membranes described herein can be made of a biocompatible impermeable material, such as a cyclo-aliphatic hydrocarbon. Front and back membranes 22, 24 can be made of the same or different materials.

The reservoir can also be made of a flexible, transparent, water impermeable material. In one embodiment, the reservoir and membrane are made of the same materials. In other embodiments, the reservoir and membrane are different materials. For example and without limitation, the reservoir can be made of Polyvinyledene Difluoride, such as Heat-shrink VITON(R), supplied by DuPont Performance Elastomers LLC of Wilmington, Del., DERAY-KYF 190 manufactured by DSG-CANUSA of Meckenheim, Germany (flexible), RW-175 manufactured by Tyco Electronics Corp. of Berwyn, Pa. (formerly Raychem Corp.) (semi rigid), or any other suitable material. Additional embodiments of a reservoir are described in U.S. Publication No. 2011-0102735, which is incorporated herein by reference.

In some embodiments, front surface 12 of contact lens 10 is spherical and can have the same curve across its entire surface. In one embodiment, back surface 14 is aspheric and has a more complex front surface curvature that gradually changes from the center of the lens out to the edge, so as to provide a slimmer profile and a desired power profile as a function of the gaze angle, the gaze angle being defined herein as the angle formed between the actual line of sight and the principal axis of the lens including the fluid.

In one embodiment, front surface 12 has a meniscus shape, i.e., convex at its front side and concave at its back side. Thus, both the front and the back surfaces 12, 14 are curved in the same direction. Back surface 14 can be thicker in the center and thinner at the edge, i.e., the radius of curvature of front surface 12 is smaller than the radius of curvature of back surface 14.

In one embodiment, contact lens 10 is made of a conventional soft contact lens material, such as silicone hydrogel cross-linked polymer having a refractive index from 1.42 to 1.46. Contact lens 10 can alternatively be a rigid optical lens made of glass, plastic, or any other suitable material. Some suitable materials include, for example and without limitation, Diethylglycol bisallyl carbonate (DEG-BAC), poly (methyl methacrylate) (PMMA), and a polyurea complex, Polycarbonate of Bisphenol A or CR-39 (Diethylene glycol bisallyl carbonate). Contact lens 10 can be made of an impact resistant polymer and can have a scratch resistant coating or an antireflective coating.

The fluid used in the fluid lens can be a colorless fluid; however, other embodiments include fluid that is tinted, depending on the application. One example of fluid that can be used is manufactured by Dow Corning of Midland, Mich., under the name "diffusion pump oil," which is also generally referred to as "silicone oil." In some embodiments, the fluid can be an aliphatic polysiloxane having a refractive index matching the contact lens material.

As described above, contact lens 10 comprises actuator 28 that operates to compress reservoir 20 to transfer fluid between reservoir 20 and optical zone 30, which deforms lens chamber 18. In one embodiment, actuator 28 is a piezo-electric actuator. For example, actuator 28 can include a piezo-electric material configured to deform when a voltage is applied over the material. In one embodiment, the piezo-electric material includes transparent electrodes attached thereto. In one embodiment, actuator 28 impinges against reservoir 20 and is movable in opposing directions substantially transverse to reservoir 20. Movement of actuator 28 in a direction towards reservoir 20 increases pressure within reservoir 20, and movement of actuator 28 in a direction away from reservoir 20 decreases pressure within reservoir 20. In one embodiment, piezo-electric actuator 28 is not noticeable to a user wearing contact lens 10.

Examples of suitable piezoelectric materials include piezoelectric substances, such as barium titanate, Rochelle salt, rock crystal, tourmaline, potassium dihydrogenphosphate (KDP), ammonium dihydrogenphosphate (ADP), and lithium niobate, polycrystals of the piezoelectric substances, crystals of the piezoelectric substances, piezoelectric ceramics comprising a solid solution of $PbZrO_3$ and $PbTiO_3$, organic piezoelectric substances, i.e. polyvinyl difluoride (PVDF), and other ferroelectric materials.

Power may be supplied to actuator 28 from a capacitor 38. Capacitor 38 may be any capacitor suitable to be implemented in a small optical component, such as a supercapacitor utilizing ion doped carbon nanotubes. Other suitable capacitors can be used. In one embodiment, these parts are not noticeable to a user wearing contact lens 10.

Power can be supplied to capacitor 38 in a number of different ways. For example, power from a user's blinks can be harnessed by a pressure sensor 34. Pressure sensor 34 may be, for example, a piezoelectric component that converts blinking pressure forces into electricity, which is then stored in capacitor 38. A thermoelectric generator 36 can alternatively or additionally be used to generate power for the actuator by using the See beck effect to harness power from a temperature gradient over the contact lens. In another example, power can be added to capacitor 38 via wireless induction from an external source.

For some embodiments, the power requirement to support lens module 16 is estimated to be less than 10 microwatts. In some embodiments, each component can be powered by a single power supply. In other embodiments, components can have separate power sources as desired. Likewise, the various components can be housed within a single unit or for some embodiments. In some embodiments, the components can be housed separately so as to distribute them across the lens module.

The electric potential stored in capacitor 38 can be used by actuator 28 to change the optical power of the lens module 16. An action by a user can trigger action by actuator 28. For example, contact lens 10 can include a sensor configured to sense movement from a user wearing the contact lens. When a predetermined movement is performed by the user and sensed by the sensor, the sensor can send a control signal to a processor (described below). Upon receipt of the control signal, the processor is configured to actuate actuator 28.

In one embodiment, the predetermined movement is a predetermined blinking pattern and a pressure sensor (described below) is configured to detect blinking by a user wearing the contact lens. For example, a double or triple blink can be used as a signal to change optical power.

In another embodiment, the predetermined movement is a movement of the user's eyeball in a particular pattern, and a microaccelerometer is configured to detect that motion of the user's eyeball. For example, contact lens 10 can include an angle sensor and can be arranged, for example, such that when the user looks down, the lens module 16 is adjusted to provide focus for a near object, whereas when the user looks up or faces horizontally, the lens module 16 can be adjusted to focus on a far object. In some embodiments, the optical power can be changed by the user moving their eyeballs or opening and closing their eyelids in a specific pattern. In one embodiment, microaccelerometer 42 is not noticeable to a user wearing contact lens 10.

In a further embodiment, the predetermined movement is a predetermined movement of the user's eyebrows and a pressure sensor is configured to detect such a movement of the user's eyebrows. For example, three eyebrows shrugs in a row can be used as a signal to change optical power.

The eyebrow shrug accompanies a tightening of eye muscles that may be sensed by a piezoelectric pressure sensor, the output of which is utilized to provide a trigger for activation of the fluid cell.

A processor 40, such as an application-specific integrated circuit (ASIC) can be used to receive signals from the sensor(s), amplify or otherwise process the signal, and deliver the signal to provide voltage to actuator 28 via capacitor 38. Processor 40 can include various combinations of analog or digital logic circuitry in the form of discrete components or integrated circuits, hardware, software, and/or firmware under computer or microprocessor control. Processor 40 can also include various functional and/or structural components such as memory, timing, and data processing, transmission, and reception structures and devices necessary to support the operation of lens module 16. In one embodiment, the processor is not noticeable to a user wearing contact lens 10.

In an embodiment, lens module 16 may have two different states, such that the optical power of the lens is automatically switched from one state to the other state anytime a predetermined movement is detected by the sensor(s). This may allow a user to switch easily between, for example, a near-field optical power and a far-field optical power. This bistable configuration may be built into the edge or peripheral portions of the membrane. In such a case, the stable configurations may include one particular dimension of the reservoir 20 associated with two unequal volumes, one corresponding to the liquid cell module configuration required to provide correction for distance vision, the other corresponding to the configuration required to provide correction for near vision of the user. In this embodiment, the actuator triggers and enables the movement of the reservoir from one volume configuration to the other, but the energy to cause this movement comes from mechanical energy in the reservoir material or the actuator material itself.

In another embodiment, one type of movement by a user indicates to actuator 28 that the power should be increased by a predetermined increment, while another type of movement by the user indicates that the power should be decreased by a predetermined increment.

In an embodiment, once the optical power of contact lens 10 is adjusted, actuator 28 can be altered or disabled to prevent further adjustment of the optical properties of contact lens 10 by the wearer.

In an embodiment, actuator 28, pressure sensor 34, thermoelectric generator 36, capacitor 38, processor 40, and/or microaccelerometer 42, as well as the requisite connections therebetween, are made of transparent or translucent materials so as to minimize their appearance on the user's eye when the user is wearing contact lens 10. Additionally or alternatively, actuator 28, pressure sensor 34, thermoelectric generator 36, capacitor 38, processor 40, and/or microaccelerometer 42, as well as the requisite connections therebetween, can be made small enough, for example out of micromaterials or nanomaterials, that their appearance is on the user's eye when the user is wearing contact lens 10 is unascertainable.

The foregoing-described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 3:
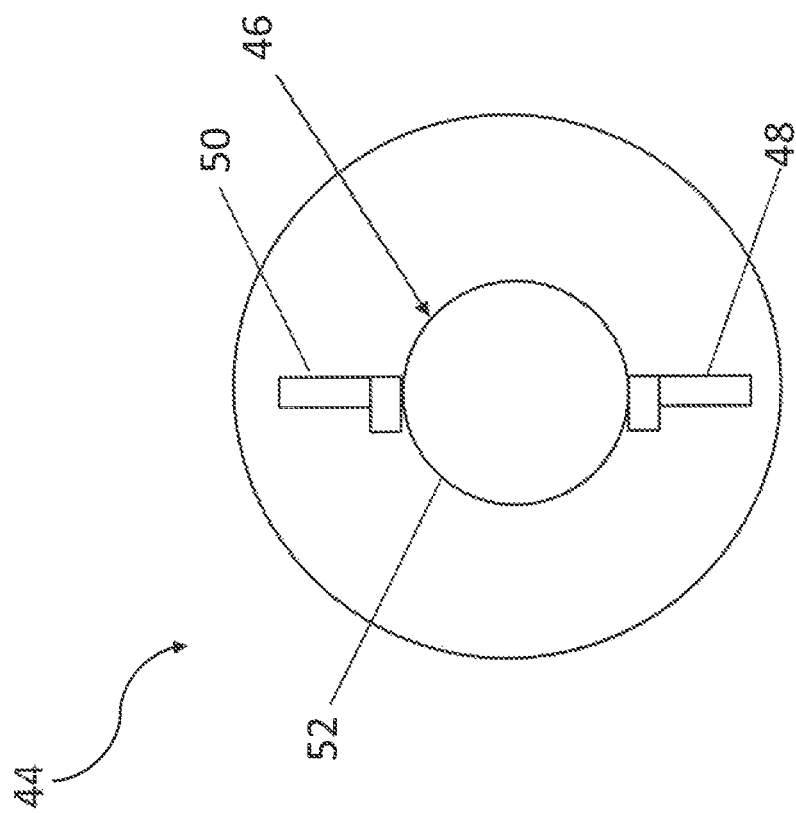
FIG. 3 illustrates a front view of another embodiment of a fluid filled adjustable contact lens.
Figure 4:
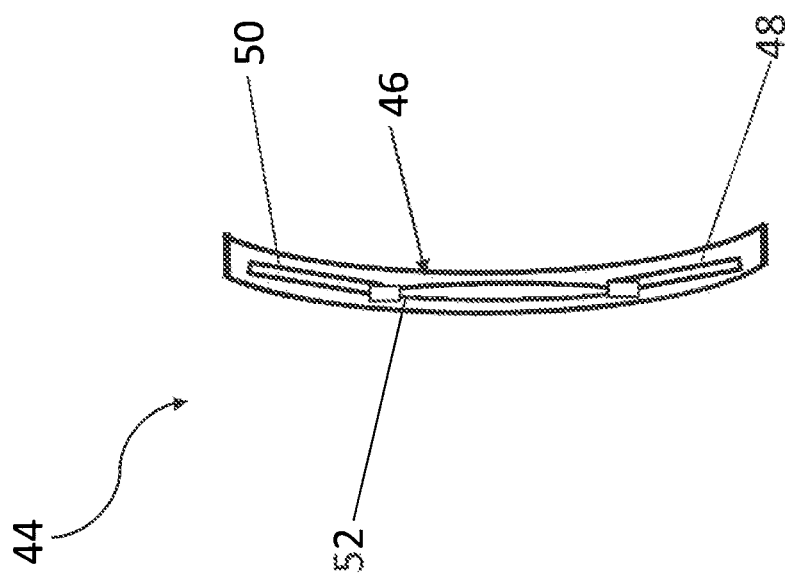
FIG. 4 illustrates a side view of the contact lens of FIG. 3.

FIGS. 3 and 4 illustrate a front and side view, respectively of another contact lens embodiment 44 including a plurality of reservoirs surrounding optical zone 46. For simplicity, contact lens 44 is illustrated with fewer than all of the components described above with respect to FIGS. 1 and 2. However, one of skill in the art will recognize that sensor and electrical components described above with respect to FIGS. 1 and 2 may also be incorporated into the embodiments of FIGS. 3 and 4. Contact lens 44 includes a first reservoir 48 extending in a downward direction from optical zone 46 and second reservoir 50 extending in an upward direction from optical zone 46. This opposing arrangement of reservoirs can allow for the reservoirs to balance each other so that the contact lens maintains proper positioning on a user's eye. Reservoirs 48 and 50 can be positioned in different arrangements. For example, both reservoirs can be located at the bottom of the contact lens, or can be located at a 90 degree angle, or any other suitable angle, relative to each other. In one embodiment, more than two reservoirs are provided along outside edge 52 of optical zone 46. For example, reservoirs can be positioned at radial holes spaced at regular intervals around outside edge 52. In another embodiment, reservoirs are positioned only along a top portion of optical zone 46.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way. In particular, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is therefore not intended to be limiting as to the scope of the present invention in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A fluid-filled adjustable contact lens comprising:
a front surface and a back surface;
a lens chamber disposed between the front surface and the back surface,
wherein the lens chamber comprises a front membrane sealed to a back membrane;
wherein the lens chamber is configured to be positioned on a pupil of a user wearing the contact lens;
wherein the front surface and the back surface are configured to counteract astigmatism caused by deformation of the lens chamber;
wherein the fluid-filled adjustable contact lens is located outside of an eyeball of the user;
a reservoir fluidly connected to the lens chamber;
an actuator configured to transfer fluid back and forth between the lens chamber and the reservoir,
wherein the fluid-filled adjustable contact lens is configured so that the transfer of the fluid causes a change in an optical power of the fluid-filled adjustable contact lens by changing a first curvature of the front membrane of the lens chamber, which causes a change of a second curvature of the front surface of the fluid-filled adjustable contact lens;
wherein the reservoir and the actuator are housed within the fluid-filled adjustable contact lens;
a sensor configured to sense movement from the user and transmit a control signal when a predetermined movement is performed by the user; and
a processor configured to actuate the actuator upon receipt of the control signal from the sensor.

2. The contact lens of claim 1, wherein the sensor is a pressure sensor configured to detect blinking by the user wearing the contact lens, and wherein the predetermined movement is a predetermined blinking pattern.

3. The contact lens of claim 1, wherein the sensor is a microaccelerometer configured to detect motion of the user's eyeball, and wherein the predetermined movement is a predetermined pattern of movement of the user's eyeball.

4. The contact lens of claim 1, wherein the sensor is a sensor configured to detect movement of the user's eyebrows, and wherein the predetermined movement is a predetermined pattern of movement of the user's eyebrows.

5. The contact lens of claim 1, further comprising a capacitive power source configured to supply power to the actuator and the processor.

6. The contact lens of claim 5, further comprising: a thermoelectric power generator configured to supply power to the capacitive power source by harnessing power from a temperature gradient over the contact lens.

7. The contact lens of claim 5, further comprising: a piezoelectric component configured to convert a blinking pressure force into electricity for storage in the capacitive power source.

8. The contact lens of claim 5, wherein the capacitive power source is an inductive power source.

* * * * *